(No Model.) 6 Sheets—Sheet 3.

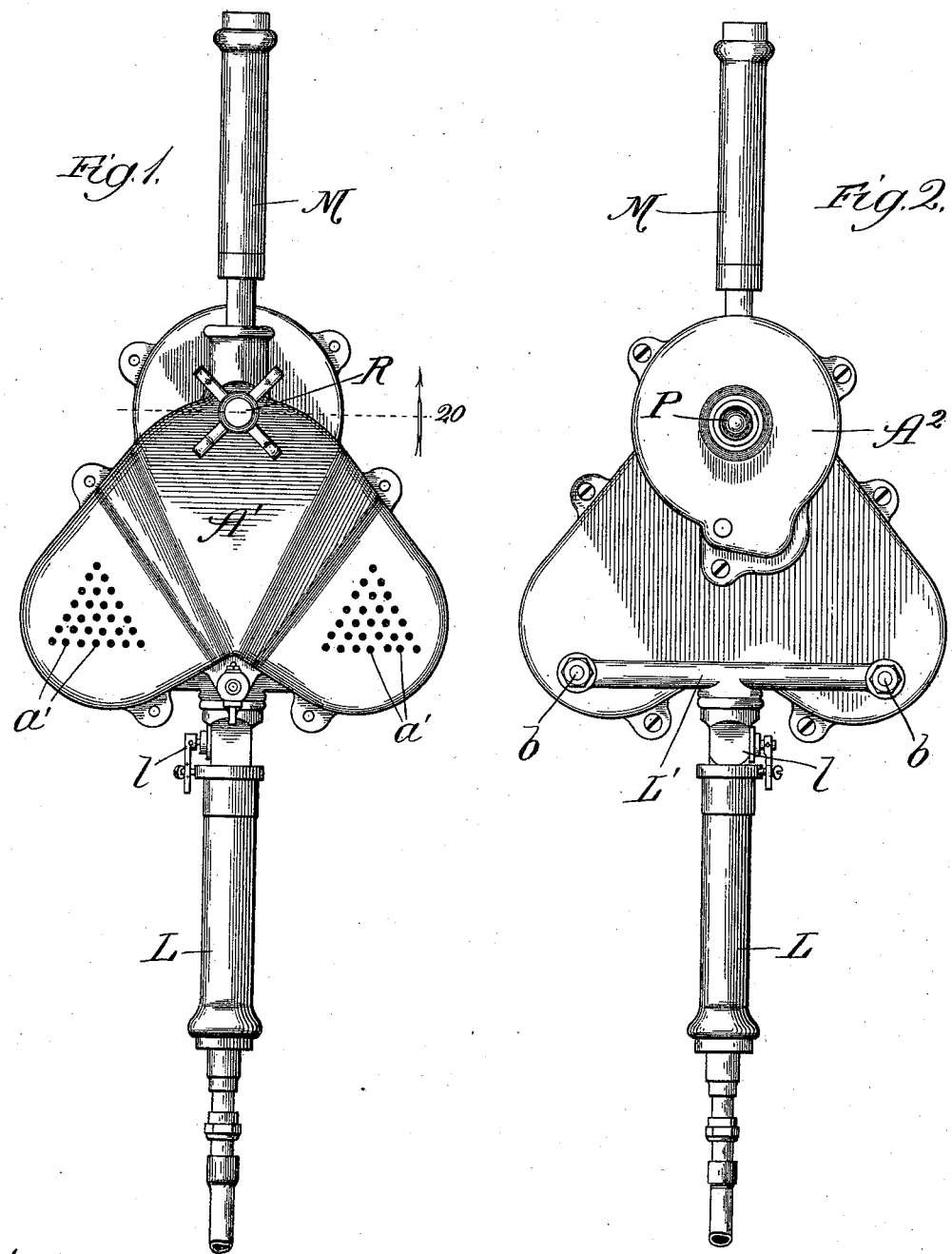

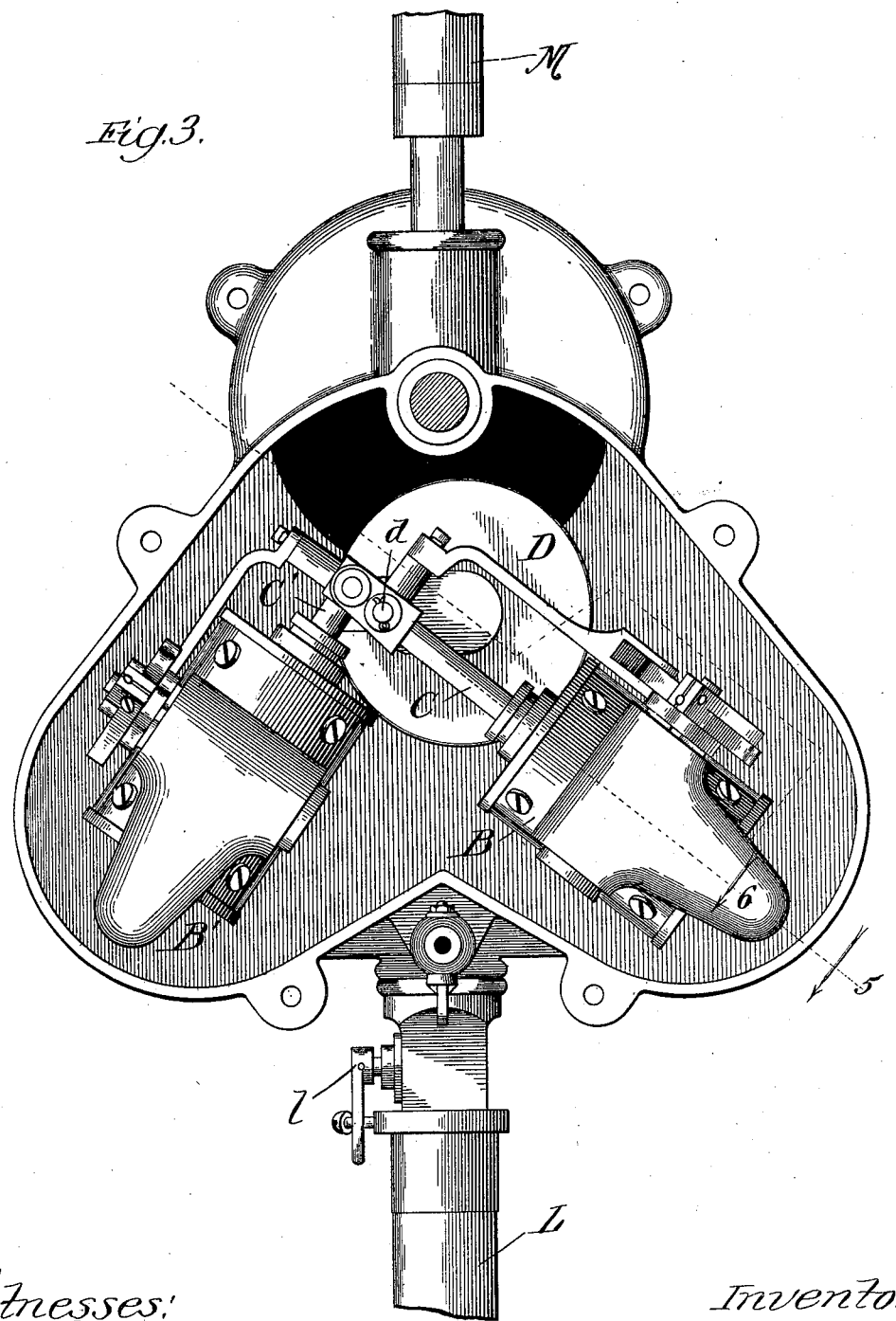

F. M. COMSTOCK.
FLUID PRESSURE ENGINE.

No. 590,657. Patented Sept. 28, 1897.

Witnesses:

Inventor:
Francis M. Comstock,
By Banning & Banning & Sheridan,
Att'ys (No Model.) 6 Sheets—Sheet 4.
F. M. COMSTOCK.
FLUID PRESSURE ENGINE.
No. 590,657. Patented Sept. 28, 1897.
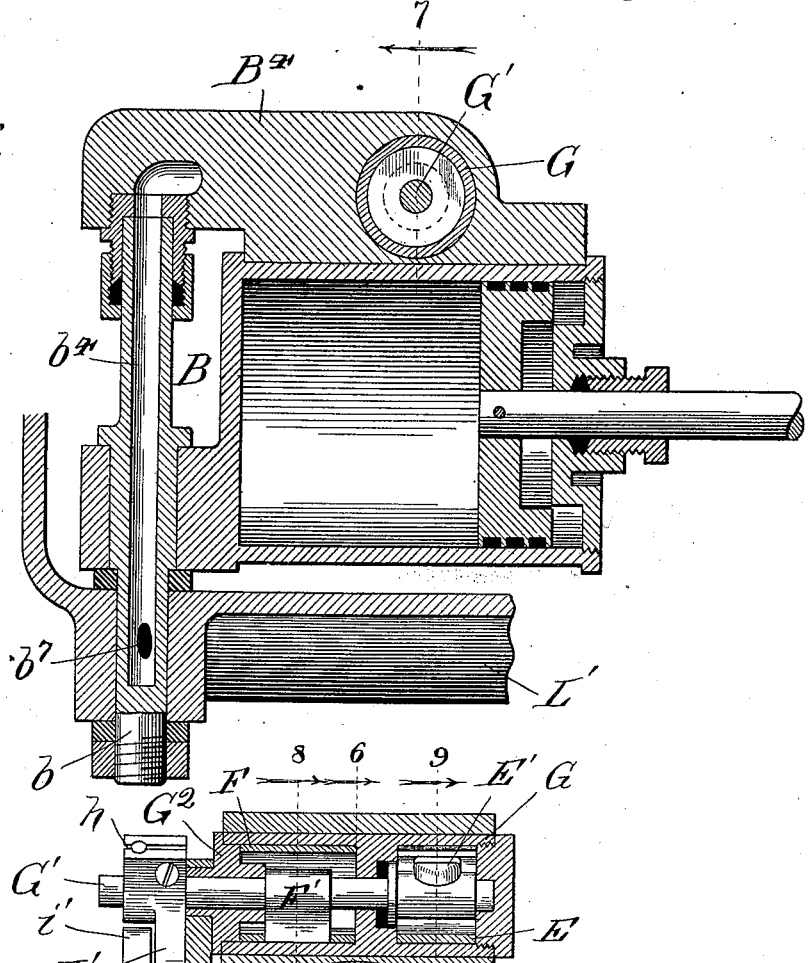
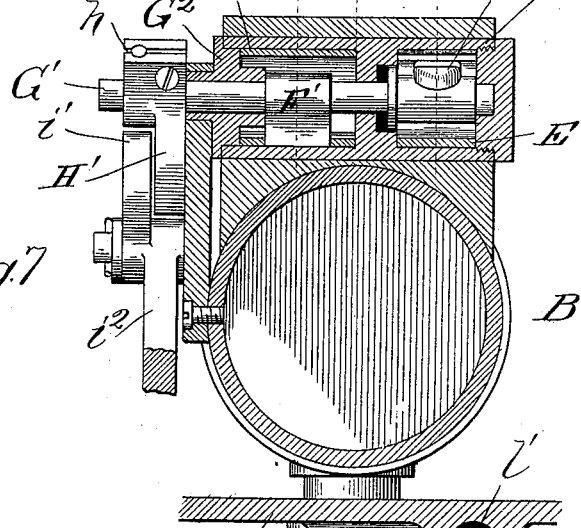
Witnesses: Inventor;
Francis M. Comstock (No Model.) 6 Sheets—Sheet 5.
F. M. COMSTOCK.
FLUID PRESSURE ENGINE.
No. 590,657. Patented Sept. 28, 1897.
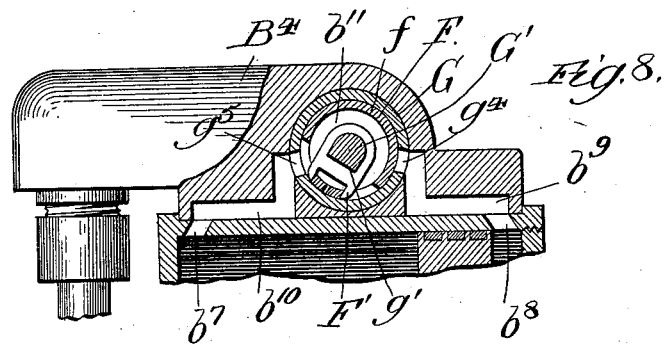
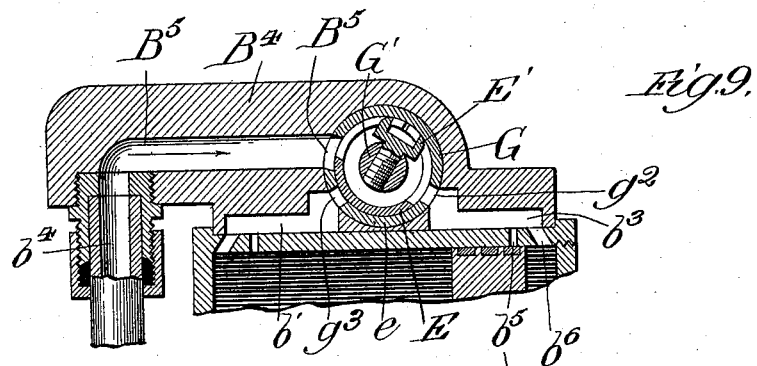
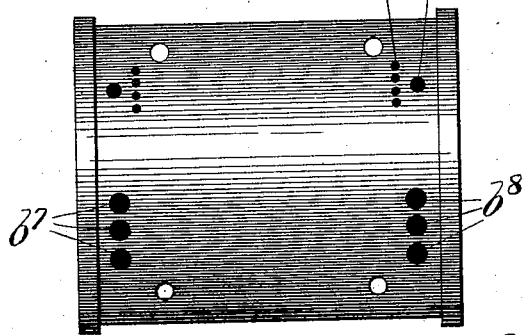
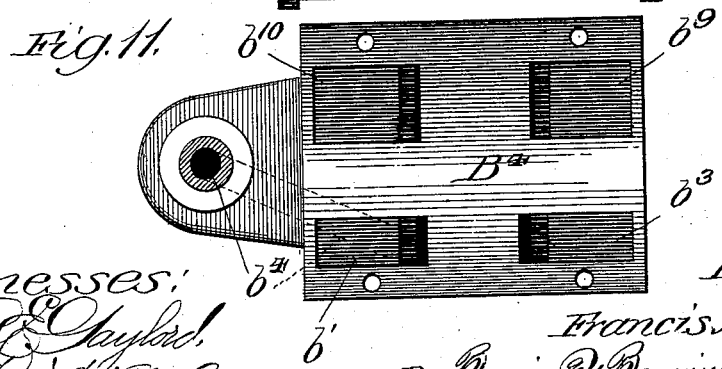
Witnesses:
Chas. C. Gaylord.
Inventor,
Francis M. Comstock
By Banning & Banning & Sheridan,
Attys.

(No Model.) 6 Sheets—Sheet 6.
F. M. COMSTOCK.
FLUID PRESSURE ENGINE.
No. 590,657. Patented Sept. 28, 1897.
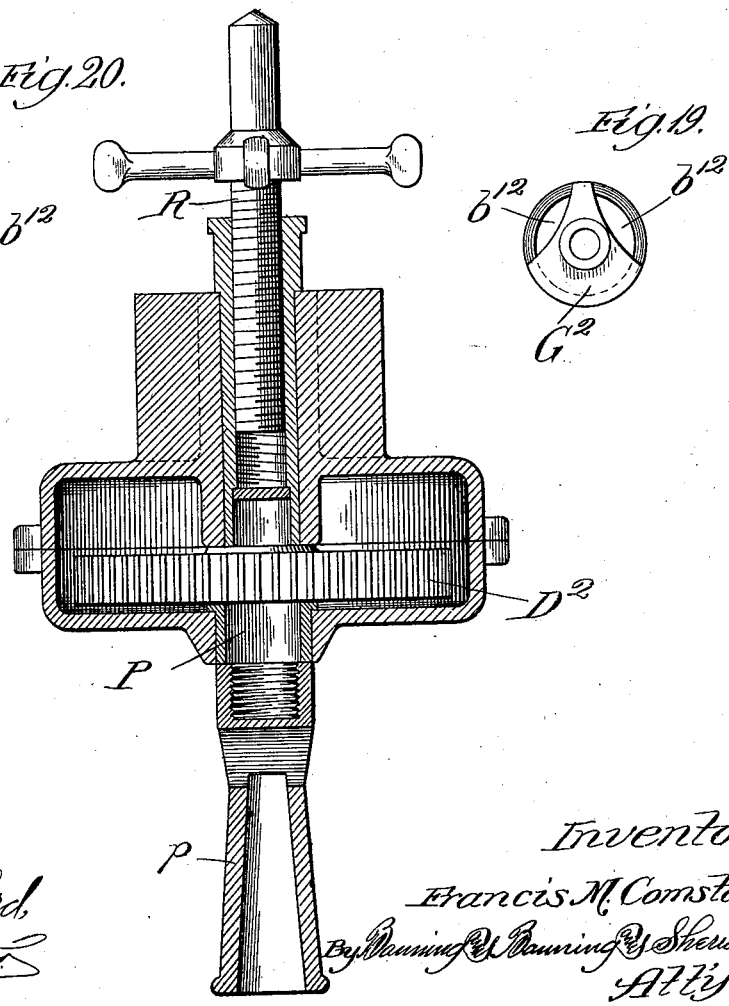
Witnesses:
Chas. E. Gaylord
Little S. Peter
Inventor:
Francis M. Comstock,
By Banning & Banning & Sheridan,
Attys.

UNITED STATES PATENT OFFICE.

FRANCIS M. COMSTOCK, OF TOPEKA, KANSAS, ASSIGNOR TO THE COMSTOCK MOTOR COMPANY, OF SAME PLACE.

FLUID-PRESSURE ENGINE.

SPECIFICATION forming part of Letters Patent No. 590,657, dated September 28, 1897.

Application filed January 4, 1897. Serial No. 617,910. (No model.)

*To all whom it may concern:*

Be it known that I, FRANCIS M. COMSTOCK, a citizen of the United States, residing at Topeka, Shawnee county, Kansas, have invented certain new and useful Improvements in Fluid-Pressure Engines, of which the following is a specification.

My invention relates particularly to multiple engines adapted to the use of fluid-pressure, and has especial relation to valve and other mechanisms that permit of and regulate the admission of the fluid-pressure.

The object of my invention is to provide a simple, economical, and efficient multiple fluid-pressure engine with simple and efficient valve mechanism; and the invention consists in the features, combinations, and details of construction hereinafter described and claimed.

Figure 4:
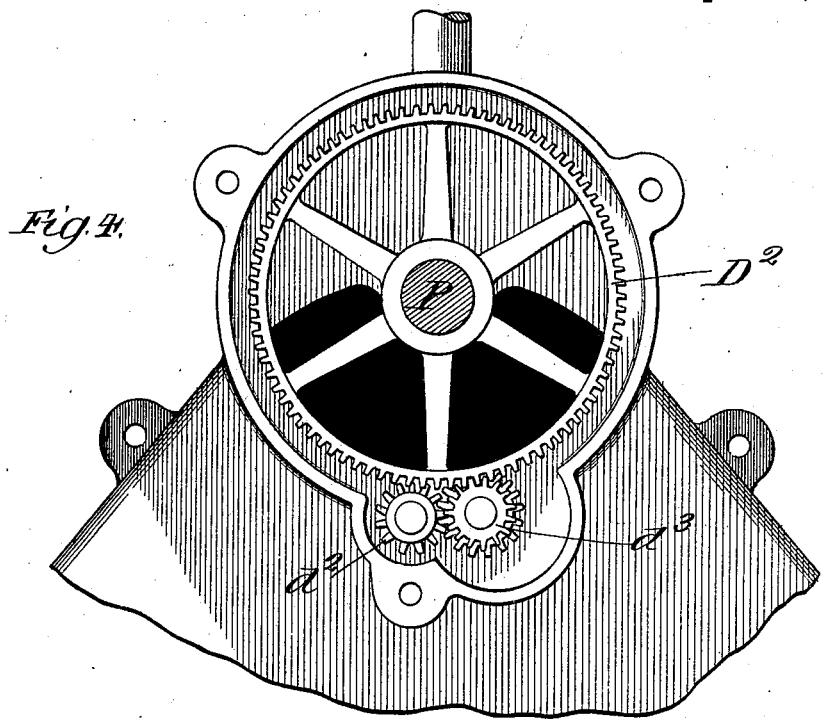
Figure 5:
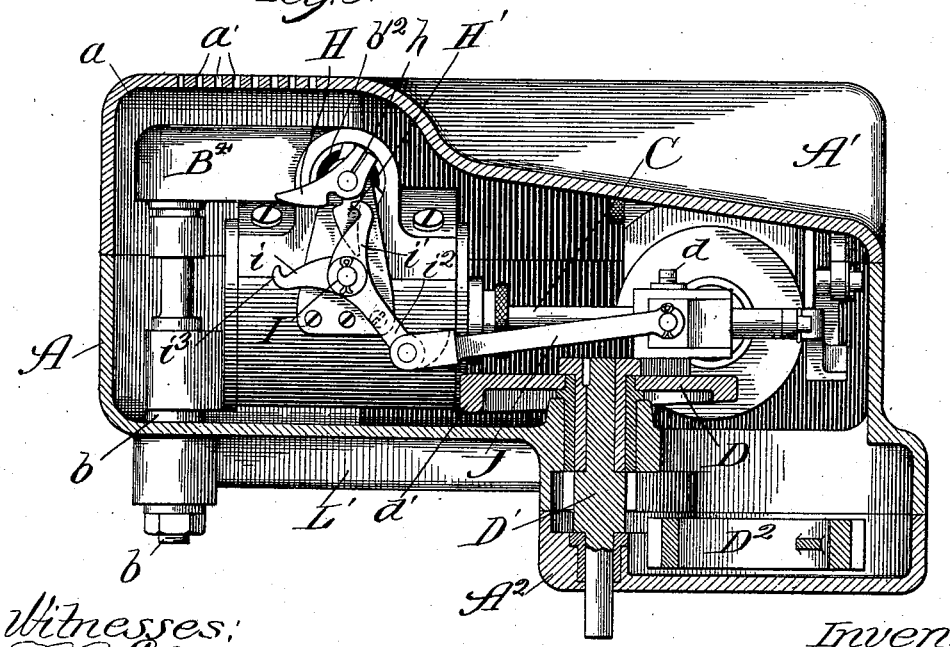

In the accompanying drawings, Figure 1 is a plan view of a complete engine and casing constructed in accordance with my improvements, looking at it from the top; Fig. 2, a similar view looking at it from the bottom; Fig. 3, an enlarged plan view of the engine with the upper casing removed, looking at it from the top; Fig. 4, a plan view of a portion of the engine with the lower cap removed, looking at it from the bottom; Fig. 5, a cross-sectional view taken on the irregular line 5 of Fig. 3; Fig. 6, a longitudinal sectional elevation taken on line 6 of Figs. 3 and 7; Fig. 7, a transverse sectional view taken on line 7 of Fig. 6; Figs. 8 and 9, longitudinal sectional views of portions of the mechanism, taken on lines 8 and 9, respectively, of Fig. 7; Fig. 10, a plan view of the upper portion of the cylinder with the valve removed and showing the inlet and exhaust openings; Fig. 11, a plan view of the bottom of the valve-plate; Fig. 12, a detail view of the valve-bushing; Figs. 13 and 14, detail views of the inlet and exhaust valves; Fig. 15, a detail view of the valve-stem; Figs. 16 and 17, detail views of the dogs for communicating power and motion from the valve-stem to the inlet and exhaust valves, respectively; Fig. 18, a detail view of the plug at one end of the valve-opening; Fig. 19, an end elevation of Fig. 18, and Fig. 20 a cross-sectional elevation taken on line 20 of Fig. 1.

In constructing an engine in accordance with my improvements I make a frame of three portions, the main portion A being adapted to contain and hold the operating portions of the engine. This main portion is provided with a cap A', adapted to cover and complete the closure of the parts, while a second cap $A^2$ covers and incloses the gear mechanism at the bottom that transmits power and motion from the crank-shaft, as hereinafter described. The fluid-pressure as it exhausts from the engine is exhausted into a chamber $a$, formed by the engine-casing, from which it escapes into the outer atmosphere through the perforations $a'$.

In constructing my complete engine I use two oscillating cylinders B and B', arranged substantially at right angles to each other, such cylinders being pivotally mounted on hollow tubes or studs $b$ at the ends thereof. These hollow studs form not only the pivot upon which the cylinders oscillate, but also form a portion of the channel for furnishing fluid-pressure to the cylinders. Each of the cylinders is provided with pistons and rods C and C', the rods of which extend out of the front end thereof and are attached to a wrist-pin $d$ upon the crank-plate D. These pistons are secured together in such relation to each other that the centers of their pins travel in orbits eccentric to each other. In Fig. 3 of the drawings it will be seen that the centers of the wrist-pins are arranged in eccentric relation to each other and in a direct line with the motion of one of the pistons.

The crank-plate is mounted upon a suitable shaft D', rotatably mounted in proper bearings in the frame portion. This crank-plate is balanced by making a rim $d'$ of variable height, forming, as it were, an inclined plane, the heaviest portion of which is arranged opposite the box that contains the wrist-pins of the pistons. The bottom portion of this crank-shaft is provided with a pinion $d^2$ and acts to drive the gear $D^2$ by means of the compound spur-pinion $d^3$. It will of course be understood, however, that this method of transmitting power and motion may be varied to suit different circumstances and conditions.

To admit fluid-pressure to the cylinders at the proper times, I provide inlet and exhaust valves E and F and mount the same in a cylindrical bushing G, arranged transversely on the central portion of the cylinder. These valves are made of cylindrical shells and split longitudinally, so that they may be contracted and compressed into position to again expand and be firmly seated against the inner surface of the valve-bushing, while at the same time permitting of an easy movement when subjected to fluid-pressure. A valve-rod G' is provided having its bearing portions in the valve-bushing and end plug $G^2$. This valve-rod is provided with spanner-dogs E' and F', that engage with the inlet and exhaust valves, respectively. As shown in Figs. 8 and 9, the spanners engage with the free ends of the valves, so that during the vibrations or oscillations of the valve-rod the valves are in a measure contracted to permit of an easy movement, even when fluid-pressure is in engagement with such valves. This is an important advantage in that it in a large measure reduces the engaging friction of the valves with the valve-seats. The spanner-dog E' is preferably screw-threaded into the valve-rod, while the spanner-dog F' for the exhaust-valve is passed around a D-shaped portion $g'$ of such valve-rod and given its motion thereby.

In order to transmit power and motion in as uniform a manner as possible from the pistons to the rotating crank-shaft of this peculiar type of engine, I have discovered that it is desirable to provide a cushion for the piston at each end of the stroke, at the same time operate the valve for the initial admission of steam, and provide for the piston itself to complete the opening of ports and mechanism by which the full fluid-pressure is admitted into the cylinder in order that the piston may be given a gradually-increasing impact and no sudden blow delivered thereby. By an arrangement of mechanism that accomplishes this result I have found that I obtain as good a balanced and even-running mechanism as I formerly obtained by the use of an engine, having three cylinders arranged on a circle, of the well-known brotherhood type. To accomplish this result, I preferably provide the valve-casing $B^4$ with inlet-passages $b^3$ and $b^4$, that lead from the inlet-valves to each end of the cylinder. Each end of the cylinder-casing in the inlet-passages is provided with two sets of passages $b^5$ and $b^6$, arranged at different points on the longitudinal length of the cylinder. These inlet-passages are preferably made in the shape of perforations, the perforations $b^5$ when taken together being about four times the area of the perforations $b^6$, so that when the inlet-valve is opened to admit fluid-pressure the right-hand portion of the cylinder and the piston occupy the position shown in Fig. 9 of the drawings. The perforation or inlet-passage $b^6$ is not closed, and at no time is such perforation closed, so that fluid-pressure is admitted behind such piston to act as a cushion. At the same time when the crank has been carried past the center it acts to allow fluid-pressure to give the initial impulse to the piston. The movement of the piston to the left causes the uncovering of the passages $b^5$, so that the advantage of the fluid-pressure is felt on the piston in a gradual manner to give it its maximum power and velocity.

To operate the valve so that during one movement of the piston the inlet-port at one side, the side that is taking pressure, is closed, the exhaust on the same side opened, the inlet-passage on the opposite side opened, and its exhaust closed during one motion of the piston, I provide the valve-rod with two cam-shaped levers H and H'. Adjacent to these cam-shaped levers I provide a pivoted double lever I with two cam-arms $i$ and $i'$ on one end to contact the levers H and H' and a single lever $i^2$ at the opposite end engaging with the piston-rod by means of a connecting-rod J.

As shown in Fig. 5, when the piston is moved backward the long end of the cam-lever H' will be contacted by the short end of the arm $i$. Their surfaces coming into contact this relation is gradually reversed until the inlet-valve is closed at a time when the cam-levers are arranged in substantially vertical position or when a line drawn coincident with the slot $h$ assumes a vertical position. At this time both of the inlet-valves and both of the exhaust-valves are closed—that is, the solid portion $e$ closes both of the ports $g^2$ and $g^3$ in the valve-bushing and the solid portion $f$ covers the exhaust-ports $g^4$ and $g^5$ in the bushing. It will be seen, therefore, that at this time the fluid-pressure is exhausted from one side and is acting expansively on the other side of the piston. The continued motion of the piston forces the hook $i^3$ into engagement with the short end or recess of the inner short end of the cam-lever H', giving such lever an accelerated movement to throw or operate the valve, so that the inlet-port on the other side of the piston can take pressure to form the cushion and initial impulse. When the piston, by means of the other engine, is carried beyond the center, the piston is given an initial impulse and the parts operated in the reverse manner. The pressure is exhausted from the cylinder through the openings $b^7$ $b^8$ to enter through the exhaust-passages $b^9$ and $b^{10}$, and when the exhaust-valve is in the proper position it enters through the passage $b^{11}$ in such exhaust-valve and out through the openings $b^{12}$ in the plug $G^2$ to enter the casing-chamber and be exhausted as hereinbefore described. The valve-casing is provided with a channel B', that is connected with a passage $b^4$ of the stud upon which the cylinders are pivoted.

To furnish a duct or pipe for conveying pressure to the channel of this pivotal stud, I provide a vibratory movable handle portion L, which has a throttle-valve $l$ arranged therein to be operated by the rotary motions of such handle and open and close the throttle-valve, as desired. The passage in this admission-pipe connects with a channel $l'$ in a rib $L'$ on the lower portion of the casing, which channel leads to the openings $b^7$ in the pivotal studs. A second handle M is provided by which the engine may be held in both hands when desired to operate the same. This last handle portion may be made detachable, so that if it be necessary to use the engine in a cavity or recess such use can be accomplished.

The operating-shaft P, upon which the large spur-gear is mounted, is provided at one end with a tool-socket $b$, and the frame at the point opposite this tool socket or shaft is provided with a feed-screw R for forcing or feeding the drill or other tool to the work.

While I have described my invention with more or less minuteness as regards details and as being embodied in certain precise forms, I do not desire to be limited thereto unduly any more than is pointed out in the claims. On the contrary, I contemplate all proper changes in form, construction, and arrangement, the omission of immaterial elements, and the substitution of equivalents, as circumstances may suggest or necessity render expedient.

I claim—

1. In a multiple fluid-pressure engine, the combination of a frame portion, two oscillating cylinders pivotally secured thereto substantially at right angles to each other, a crank-shaft rotatably mounted in the frame, and a piston-rod in each of the cylinders secured to the crank-shaft in eccentric relation with each other and in line with the movement of one of the piston-rods, substantially as described.

2. In a fluid-pressure engine, the combination of a cylinder provided with independent inlet and exhaust passages the inlet-passage being provided with two sets of openings into the cylinder near each end of the cylinder, a reciprocating piston movably mounted in the cylinder portion and arranged during its movements to cover and uncover one set of the inlet-openings in the cylinder so that fluid-pressure by means of the piston is gradually fed into the cylinder, and valve mechanism to open and close the inlet and exhaust passages, substantially as described.

3. In a fluid-pressure engine, the combination of a cylinder provided with independent inlet and exhaust passages entering the cylinder at or near each end thereof the inlet-passages opening into the cylinder in two sets of openings located at different positions longitudinally on the cylinder the openings nearest the heads of the cylinder being of smaller area than the ones remote therefrom, a piston movably mounted in such cylinder and adapted to cover and uncover the set of openings remote from the cylinder-heads so that pressure is gradually fed into the cylinder, and valve mechanism for opening and closing the inlet and exhaust passages, substantially as described.

4. In a fluid-pressure engine, the combination of a cylinder provided with independent inlet and exhaust passages and openings, a piston movably mounted in the cylinder to cover and uncover one set of openings, independent rotary exhaust and inlet valve mechanism located transversely in the cylinder-frame to open and close the inlet and exhaust passages, and mechanism arranged to operate such valves by the movement of the piston to close the inlet and open the exhaust on one side of the piston and completely open the inlet-valve and completely close the exhaust-valve on the opposite side of the piston during one motion of the piston, substantially as described.

5. In a fluid-pressure engine, the combination of a cylinder provided with independent inlet and exhaust passages, such inlet-passages being provided with two sets of openings at or near each end of the cylinder, a piston movably mounted in the cylinder to cover and uncover one set of openings and gradually feed fluid-pressure into the cylinder, rotary exhaust and inlet valve mechanism located transversely in the cylinder-frame to open and close the inlet and exhaust passages, and mechanism arranged to operate such valves by the movement of the piston to close the inlet and open the exhaust on one side of the piston and completely open the inlet-valve and completely close the exhaust-valve on the opposite side of the piston during one motion of the piston, substantially as described.

6. In a fluid-pressure engine, the combination of a cylinder provided with inlet and exhaust passages, a piston movably mounted in said cylinder, rotary inlet and exhaust valve mechanism located transversely in such engine-frame to open and close the inlet and exhaust passages, two cam-shaped lever-arms oppositely arranged to operate such valves, and a double vibrating cam-shaped lever connected with the piston-rod to operate the cam-shaped levers so that the valve mechanism is gradually operated to close the inlet and open the exhaust passages on one side of the piston and completely open the inlet and close the exhaust passages on the opposite side of the piston during one motion of the piston-rod and reverse such valve arrangements during the opposite motion of the piston, substantially as described.

FRANCIS M. COMSTOCK.

Witnesses:
D. A. MULVANE,
G. B. MANNING.